(12) United States Patent
Lasserre et al.

(10) Patent No.: US 12,322,147 B2
(45) Date of Patent: *Jun. 3, 2025

(54) PREDICTIVE CODING OF POINT CLOUDS USING MULTIPLE FRAMES OF REFERENCES

(71) Applicant: BlackBerry Limited, Waterloo (CA)

(72) Inventors: Sébastien Lasserre, Thorigné-Fouillard (FR); David Flynn, Darmstadt (DE); Gaëlle Christine Martin-Cocher, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,006

(22) Filed: Mar. 19, 2024

(65) Prior Publication Data

US 2024/0221234 A1 Jul. 4, 2024

Related U.S. Application Data

(63) Continuation of application No. 17/267,829, filed as application No. PCT/CA2019/051257 on Sep. 9, 2019, now Pat. No. 11,961,268.

(30) Foreign Application Priority Data

Oct. 2, 2018 (EP) ..................................... 18306296

(51) Int. Cl.
*G06T 9/40* (2006.01)
*H04N 19/184* (2014.01)
*H04N 19/52* (2014.01)

(52) U.S. Cl.
CPC ............. *G06T 9/40* (2013.01); *H04N 19/184* (2014.11); *H04N 19/52* (2014.11)

(58) Field of Classification Search
CPC ......... G06T 9/40; H04N 19/184; H04N 19/52
See application file for complete search history.

(56) References Cited

U.S. PATENT DOCUMENTS

2017/0214943 A1 7/2017 Cohen et al.
2017/0347120 A1* 11/2017 Chou ..................... H04N 19/89
2017/0371348 A1 12/2017 Mou
(Continued)

OTHER PUBLICATIONS

Kammerl et al. "real time compression of point cloud streams"; IEEE international conference on robotics and automation. (Year: 2012).*

(Continued)

*Primary Examiner* — Shaghayegh Azima
(74) *Attorney, Agent, or Firm* — Conley Rose, P.C.; J. Robert Brown, Jr.

(57) ABSTRACT

Methods and devices for encoding a point cloud. More than one frame of reference is identified and a transform defines the relative motion of a second frame of reference to a first frame of reference. The space is segmented into regions and each region is associated with one of the frames of reference. Local motion vectors within a region are expressed relative to the frame of reference associated with that region. Occupancy of the bitstream is entropy encoded based on predictions determined using the location motion vectors and the transform associated with the attached frame of reference.

20 Claims, 12 Drawing Sheets

(56) References Cited

U.S. PATENT DOCUMENTS

2021/0192798 A1* 6/2021 Lasserre .............. H04N 19/184

OTHER PUBLICATIONS

Rufael Mekuria: "Algorithm for inter-predictive coding of unorganized Point Cloud Data" Jun. 19, 2015.

Lasserre Setal: "[PCC]On motion compensation for geometry coding in TM3" Apr. 11, 2018.

Flynn (Blackberry)D et al: "PCC 13.5 report on occupancy contextualisation using predicted point clouds" Jul. 16, 2018.

Thanou Dorina et al: "Graph-Based Compression of Dynamic 3D Point Cloud Sequences" Apr. 1, 2016.

Seung-Ryong Han et al: "Approaches to 3D video compression" Jul. 11, 2010.

Julius Kammerl et al: "Real-time compression of point cloud streams" May 14, 2012.

"PCC Test Model Category 3 v1", 121. MPEG Meeting;22-I-2018-26-1.-2018; Gwangju Apr. 16, 2018.

Lasserre S et al: "[PCC] Neighbour-dependent entropy coding of occupancy patterns in TMC3" Jan. 21, 2018.

Lasserre S et al: [PCC] How to use a predictive set of points for geometry coding in TMC3 Apr. 11, 2018.

Lasserre (Blackberry) S et al: [PCC] Global motion compensation for point cloud compressjon in TMC3 Oct. 3, 2018.

Extended European Search Report, EP Application No. 18306296.7 Mar. 21, 2019.

International Search Report and Written Opinion, PCT Application No. PCT/CA2019/051257 Nov. 12, 2019.

US Notice of Allowance dated Dec. 28, 2023, U.S. Appl. No. 17/267,829.

US Office Action dated Jul. 21, 2023, U.S. Appl. No. 17/267,829.

* cited by examiner split flag = 0 split flag = 1 0000
pop flag = 1000 split flag = 1 1010
pop flag = 01 1001 1000 ically and effectively

PREDICTIVE CODING OF POINT CLOUDS USING MULTIPLE FRAMES OF REFERENCES

CROSS-REFERENCE TO RELATED APPLICATIONS

The present application is a continuation of U.S. patent application Ser. No. 17/267,829, which is a national phase entry from PCT patent application no. PCT/CA2019/051257, filed Sep. 9, 2019, and which claims priority to European Patent Application no. 18306296.7, filed Oct. 2, 2018, the contents of all of which are hereby incorporated by reference.

FIELD

The present application generally relates to point cloud compression and, in particular to methods and devices for predictive coding of point clouds using multiple frames of reference.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three coordinate location (X, Y, Z) and, in some cases, other attributes like colour data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of 3D scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds.

In some cases of point cloud coding, it may be possible to exploit predictive coding. Dynamic point clouds can be highly correlated temporally. Accordingly, good predictions may be identified for occupancy data, i.e. the geometric structure of the point cloud. Even with good predictions, the nature of occupancy coding may not lend itself to use of the prediction in the same manner as in video or audio coding where a residual is found by subtracting the prediction from the original data and the residual is then coded. Instead, with point clouds, the prediction may be exploited by using it to determine contexts for entropy encoding of occupancy data. The predictions may improve the context selection to such a degree that compression is improved.

Nevertheless, a problem remains in finding and coding motion vectors efficiently. It would be advantageous to provide for methods and devices that identify and code motion vectors more efficiently in point cloud coding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
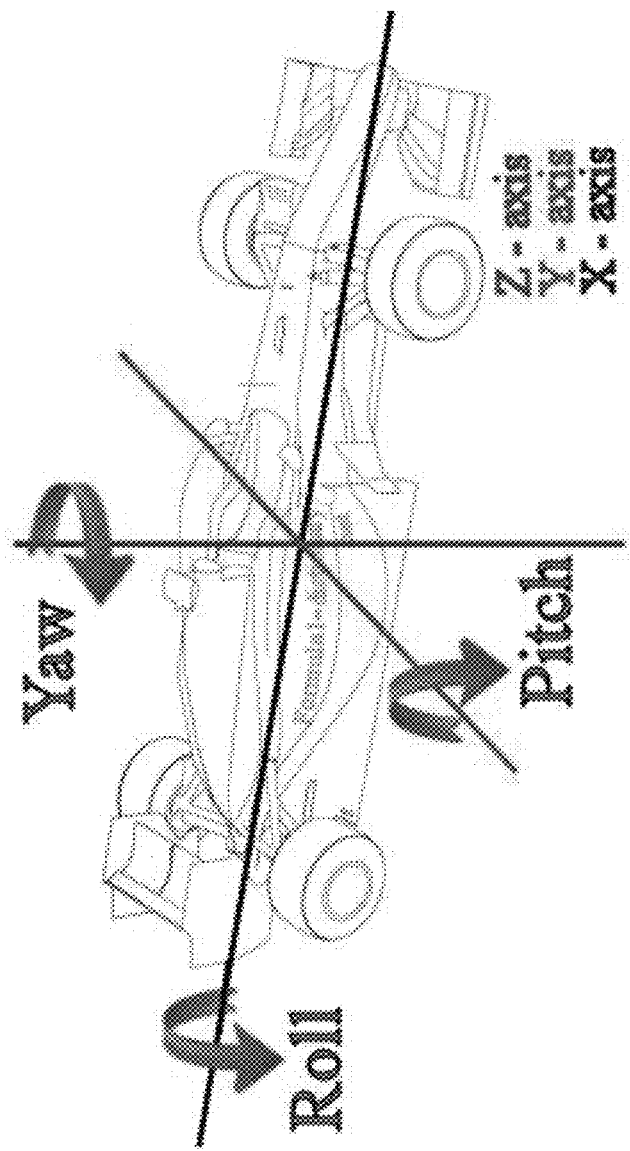
FIG. 1 depicts a vehicle and illustrates yaw, pitch and roll rotations relative to the vehicle.

The present application describes methods of encoding and decoding point clouds, and encoders and decoders for encoding and decoding point clouds.

In one aspect, the present application describes a method of encoding a point cloud, the point cloud being located within a volumetric space containing the points of the point cloud, each of the points having a geometric location within the volumetric space. The method may include determining a transform defining relative motion of a second frame of reference to a first frame of reference; segmenting the volumetric space into regions, each region being associated with one of the frames of reference; for a cuboid in one of the regions, generating a predicted sub-volume based on previously-encoded point cloud data and a local motion vector expressed relative to the frame of reference associated with said one of the regions; entropy encoding occupancy of the cuboid based in part on the predicted sub-volume; and outputting a bitstream of encoded data including the entropy encoded occupancy of the cuboid, the local motion vector, and the transform.

In another aspect, the present application describes a method of decoding encoded data to reconstruct a point cloud, the point cloud being located within a volumetric space containing the points of the point cloud, each of the points having a geometric location within the volumetric space. The method may include decoding a bitstream to reconstruct a transform defining relative motion of a second frame of reference to a first frame of reference; segmenting of the volumetric space into regions, each region being associated with one of the frames of reference; for a cuboid in one of the regions, decoding the bitstream to obtain a local motion vector expressed relative to the frame of reference associated with said one of the regions, and generating a predicted sub-volume based on previously-encoded point cloud data and the decoded local motion vector; entropy decoding the bitstream to reconstruct occupancy of the cuboid based in part on the predicted sub-volume; and outputting the reconstructed point cloud, including occupancy of the cuboid.

In some implementations, generating the predicted sub-volume may include applying the transform to the previously-encoded point cloud data to generate transformed previously-encoded point cloud data, and applying the local motion vector to the transformed previously-encoded point cloud data to generate the predicted sub-volume. In some other implementations, generating the predicted sub-volume may include applying the transform to the local motion vector to generate a transformed local motion vector and applying the transformed local motion vector to the previously-encoded point cloud data to generate the predicted sub-volume.

In some implementations, the first frame of reference may be fixed to a vehicle and the second frame of reference may be fixed to Earth.

In some implementations, segmenting includes segmenting at least a portion of the volumetric space into prediction units and assigning each prediction unit to one of the regions.

In some implementations, the method of encoding may further include determining a list of frames of reference and encoding the list, and wherein segmenting includes, for each region, encoding an index to the list that associates that region with said one of the frame of reference from the list. The method of decoding may further include decoding a list of frames of reference, and wherein segmenting includes, for each region, decoding an index to the list that associates that region with said one of the frame of reference from the list.

In yet a further aspect, the present application describes non-transitory computer-readable media storing computer-executable program instructions which, when executed, cause one or more processors to perform the described methods of encoding and/or decoding.

In yet another aspect, the present application describes a computer-readable signal containing program instructions which, when executed by a computer, cause the computer to perform the described methods of encoding and/or decoding.

In one aspect, the present application describes a bitstream of encoded point cloud data, the point cloud being located within a volumetric space recursively split into sub-volumes and containing the points of the point cloud, each of the points having a geometric location within the volumetric space. The bitstream may include an encoded transform defining the relative motion of a second frame of reference to a first frame of reference; encoded segmentation information defining segmentation of the volumetric space into regions, each region being associated with one of the frames of reference; encoded local motion vectors, each being associated with a cuboid in one of the regions, each local motion vector being expressed relative to a respective frame of reference associated with said one of the regions in which the cuboid is located; and entropy encoded occupancy data for the point cloud, wherein the entropy encoding of the occupancy data is based on predictions generated using the local motion vectors.

The present application further describes computer-implemented applications, including topography applications, cartography applications, automotive industry applications, autonomous driving applications, virtual reality applications, and cultural heritage applications, etc. These computer-implemented applications include processes of receiving a data stream or data file, unpacking the data stream or data file to obtain a bitstream of compressed point cloud data, and decoding the bitstream as described in the above aspects and its implementations. Thereby, these computer-implemented applications make use of a point cloud compression technique according to aspects and their implementations described throughout the present application.

The present application further describes methods of encoding and decoding point clouds, and encoders and decoders for encoding and decoding point clouds. In some implementations, a receiving unit receives multiplexed data which is obtained by multiplexing coded point cloud data with other coded data types such as metadata, image, video, audio and/or graphics. The receiving unit comprises a de-multiplexing unit to separate the multiplexed data into coded point data and other coded data, and at least one decoding unit (or decoder) to decode the coded point cloud data. In some other implementations, an emitting unit emits multiplexed data which is obtained by multiplexing coded point cloud data with other coded data types such as metadata, image, video, audio and/or graphics. The emitting unit comprises at least one encoding unit (or encoder) to encode the point cloud data, and a multiplexing unit to combine coded point cloud data and other coded data into the multiplexed data.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as colour, which may also be a three component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points that much more challenging.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

A commonly-used tree structure is an octree. In this structure, the volumes/sub-volumes are all cubes and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. Both these examples relate to cubes or rectangular cuboids; however, the present application is not restricted to such tree structures and the volumes and sub-volumes may have other shapes in some applications. The partitioning of a volume is not necessarily into two sub-volumes (KD-tree) or eight sub-volumes (octree), but could involve other partitions, including division into non-rectangular shapes or involving non-adjacent sub-volumes.

The present application may refer to octrees for ease of explanation and because they are a popular candidate tree structure for automotive applications, but it will be understood that the methods and devices described herein may be implemented using other tree structures.

Dynamic point clouds can be very highly correlated temporally. For example, in the case of automotive vision systems, a LiDAR scanner attached to a moving vehicle in an urban environment may capture scenes in which a number of objects move not at all or move only slightly relative to the previous point cloud scan. Scanners attached to fixed objects may find that some objects are invariant in that they do not move from point cloud to point cloud, whereas some object move significantly, like fast moving automobiles.

Prediction can be used in point cloud coding. Examples of point cloud coding using inter-prediction are described in European Patent Application no. 18305417.0, filed Apr. 9, 2018, the contents of which are hereby incorporated by reference. A difference with video coding inter-prediction is that video coding subtracts the prediction from the original data to obtain a residual that is then encoded. With point cloud occupancy data, instead of obtaining a residual, the prediction may be used as the basis for selecting contexts for encoding the original point cloud occupancy data. Accordingly, the prediction does not reduce the quantity of original data, but it may make the context-based entropy encoding of that data more efficient. Better predictions tend to result in better context selection and, then, more efficient entropy encoding. Nevertheless, to ensure that the decoder makes the same predictions and selects the same contexts for decoding, the motion vectors used to generate the predictions are encoded in the bitstream.

The motion vectors represent a cost in terms of computational complexity and time spent searching for optimal motion vectors at the encoder, and in terms of bit rate for transmitting the motion vectors. To limit the search cost, the encoder may constrain its search to a small neighbourhood, i.e. search range. The neighbourhood may be centered at a point selected based on motion vectors of nearby previously-coded sub-volumes in some cases. The cost of transmitting a motion vector is generally related to its magnitude. Larger motion vectors, signaling larger magnitude movement in the environment, are generally more costly to code and transmit. The constraint on search area and a bias for small motion vectors may lead to selection of a sub-optimal motion vector.

To address this issue, the present application proposes to exploit multiple frames of reference. In video coding, all pixels are based on a projection of the scene onto the camera sensor. The camera is the only frame of reference in video. Point cloud coding is different in that it represents a full 3D space and the geometric position of objects in that 3D space. The nature of a 3D space is that it may include a number of objects that are "motion invariant" depending on the frame of reference being used. "Motion invariant" in this application refers to objects that are fixed and do not move position over time relative to the frame of reference, or that move or change slowly with respect to the frame of reference. An object may be said to be "motion invariant" or "position invariant" if it does not move, or only moves slowly, relative to some frame of reference (also termed a "referential system" or "coordinate system").

As an example, consider the case of automotive vision using a vehicle-mounted LiDAR scanner, or any other sensor system, to generate point cloud data. The vehicle, specifically the LiDAR device, may be considered to be in a first frame of reference attached to and moving with the vehicle. Certain objects may be motion invariant with respect to that frame of reference, such as the vehicle itself. In another example, a vehicle travelling at the same speed in the same roadway may appear motion invariant in the vehicle frame of reference since its movement relative to the LiDAR is small. On the other hand, some objects may appear to be moving quickly relative to that frame of reference, including oncoming cars, buildings, or objects at the roadside. While the LiDAR device, or any other sensor system, including multiple sensors, may be positioned at a specific physical location on the vehicle, the vehicle frame of reference may have its origin positioned elsewhere in or near the vehicle, for instance at the position of a driver, at the center of the vehicle, at the LiDAR scanner, or at any other position that is convenient for a given application.

Another frame of reference might be the Earth referential system. The Earth frame of reference may be fixed relative to the buildings and fixed roadside objects. Those objects are thus motion invariant in the second frame of reference.

Some objects may appear invariant in more than one frame of reference. For example, portions of the environment may appear motion invariant in both the Earth and vehicle frames of reference when the vehicle is in motion, such as the road surface in the immediate area of the vehicle. Clearly it is fixed with respect to the Earth frame of reference, but the portion near or under the vehicle may also appear substantially motion invariant as observed in the vehicle frame of reference since its surface and width remain somewhat constant as the vehicle travels.

In some cases, more than two frames of reference may be defined.

A motion vector predicting a motion invariant object will tend to be relatively short and cost efficient to encode. Accordingly, if a frame of reference can be selected for coding objects in which they tend to be motion invariant, then the coding may be more efficient and effective.

Thus, the present application proposes that a point cloud coding process defines more than one frame of reference and a transform between a "master" or first frame of reference and each other frame of reference. If a transform is defined for the master frame of reference it may be an identity transform. The transform defines the motion of one frame of reference to the other and may include translation and, in some cases, pitch, yaw, roll, and/or more complex deformations. The volumetric space containing a point cloud may be partitioned or segmented into at least two regions. Each region is associated with one of the frames of reference. Within each region, motion search and motion compensation is carried out relative to the attached or associated frame of reference.

At the decoder, the frames of reference are determined along with the segmentation into regions and the frame of reference associated with each region. As will be described below, some of these determinations may be based on pre-selected parameters and some may be signaled in the bitstream of encoded point cloud data. Motion vectors for a region are decoded. The motion compensation applied in building a cuboid of predicted points is based on the transform, the decoded motion vector, and reference point cloud data. The reference point cloud data may be occupancy data defining a previously-coded point cloud. As will be described below there are various possible implementations for determining the predicted point cloud using the transform, decoded motion vector, and reference point cloud that are substantially the same.

With suitable segmentation and frame of reference selection, motion vectors will tend to be more compact and/or more optimal.

Prediction and Motion Vectors Search in Occupancy Coding

As will be familiar from video coding, predictive coding may include inter-prediction, where points for a sub-volume in the point cloud are predicted from the points of a previously-coded point cloud (i.e. a reference point cloud) with high temporal correlation, or intra-prediction, where points for the sub-volume are predicted from previously-coded nearby points in the same point cloud. In either case, the previously-coded points are used to build a set of predicted points within the same geometric space as the sub-volume.

The data to be coded includes geometric location of points within a volume (and possibly other attributes, like colour). An inter-coding prediction built from a temporally-related point cloud may be based on selecting a volume and translating and/or transforming that volume such that it is positioned so as to subsume (i.e. contain) the space occupied by the volume to-be-coded. Note that this does not necessarily result in a one-to-one point-to-predicted-point correspondence. Moreover, the movement of the volume of points may include both simple translation by 3D motion vector and transformation(s). The transformations may include solid transformations such as rotations, but could include non-solid transformations/deformations. A general matrix formulation for generating a 3D prediction is given by:

$$\begin{bmatrix} X' \\ Y' \\ Z' \end{bmatrix} = \begin{bmatrix} * & * & * \\ * & * & * \\ * & * & * \end{bmatrix} \begin{bmatrix} X \\ Y \\ Z \end{bmatrix} + \begin{bmatrix} V_x \\ V_y \\ V_z \end{bmatrix}$$

The motion vector V ($V_x$, $V_y$, $V_z$) gives a 3D translation, whereas the 3×3 matrix provides for possible transformation. If the 3×3 matrix is zero, one has only 3D translation along the vector V. In the case where the matrix is orthonormal, one obtains a solid transformation without local deformation of the set of points. A more general matrix allows for non-solid deformations.

The more complex structure of point clouds, and the fact that a prediction may not have a one-to-one correspondence with the points within the volume to-be-coded make selection of a suitable prediction more difficult. To select a suitable prediction, a set of candidate coding modes may be evaluated within a search range. Each candidate coding mode produces a candidate predicted set of points from a set of previously-coded points, where the candidate predicted set of points occupy a prediction volume within the 3D coordinate system. Selection of a candidate coding mode may rely on rate-distortion evaluation. The determination of rate cost may be relatively straightforward, but the determination of distortion cannot be easily determined. Because a point-to-be-coded does not necessarily have a corresponding predicted point at the same location, colour distortion is difficult to quantify. Moreover, it is not clear how to quantify distortion in geometry.

In one example, measurement of distortion between the set of predicted points within the prediction volume and the set of points to-be-coded in the current volume is based on a sum of absolute differences between each point of the set of points to-be-coded and its nearest predicted point.

A candidate coding mode M specifies a translation (and/or transformation) that, when applied to the points in W results in a repositioning of the previously-coded points in accordance with the coding mode. In this example, the coding mode M specifies a translation by three-dimensional vector V. The repositioned points are a candidate set of predicted points P. The candidate set of predicted points P is a function of W and the candidate coding mode M: P(W,M). In this case, the coding mode M is the vector V, so P(W,M)=P(W, V).

The distortion D(M)=D(B, P(W,M)) may be determined to assess how well the set of predicted points P(W, M) match up to the set of points B within the volume. In some examples, that distortion may be measured as:

$$D(B, P) = \sum_{\beta \in B} \log_2 \left(1 + \min_{\varphi \in P} \|\beta - \varphi\|_1 \right)$$

where B is the set of points to be coded in the volume, $\beta$ is a point in the set of points B, and the notation $\beta \in B$ indicates that the summation occurs over all of the points to be coded in the volume. The notation $\varphi$ refers to a point in the candidate set of prediction points P. The distance to a nearest prediction point taken from the candidate set of predicted points P is calculated as:

$$\min_{\varphi \in P} \|\beta - \varphi\|_1$$

where $\|\cdot\|_1$ stands for the L1 norm. In 3D coordinates (X, Y, Z), the distance $\|\beta - \varphi\|_1$ may be determined from the sum of absolute coordinate differences given by $|\beta_X - \varphi_X| + |\beta_Y - \varphi_Y| + |\beta_Z - \varphi_Z|$. Another norm like the L2 norm may be used instead of the L1 norm, such as:

$$\|\beta - \varphi\|_2^2 = |\beta_X - \varphi_X|^2 + |\beta_Y - \varphi_Y|^2 + |\beta_Z - \varphi_Z|^2$$

The RDO function for finding the locally-optimal motion vector V in this illustrative example may be expressed as:

$$C(V) = D(B, P(W, V)) + \lambda R(V)$$

where C(V) is the RDO cost associated with vector V, which specifies predicted set of points P(W, V) given search range W within the previously-coded points, and $\lambda$ is the Lagrange parameter.

Accordingly, the vector $V_{best}$ that minimizes the cost is obtained by:

$$V_{best}(B) = \arg\min_V C(V) = \arg\min_V D(B, P(W, V) + \lambda R(V))$$

In order to maintain reasonable encoder complexity, a non-exhaustive motion vectors search is used; generally, by spatially limiting the search area or window and by using early termination strategies. Consequently, small motion, i.e. short ground truth motion vectors, are usually better captured by the search algorithms. Also, the rate cost of coding motion vectors increases with the length of the motion vector. However, if multiple frames of reference are used then the length of the motion vectors may be reduced, which will save bitrate and may make the search more efficient.

Frames of Reference and Transforms

The terms "frame of reference" and "referential system" may be used interchangeably herein. Many of the examples below will discuss two frames of reference: an Earth frame of reference and a vehicle frame of reference; however, it will be appreciated that the present application is not limited to two referential systems. For example, one may imagine more referential systems when more than one vehicle is involved.

Once a "master" referential system is selected, all other referential systems have a motion relative to this master. One example is to have the vehicle referential system as master frame of reference and the Earth referential system as a second frame of reference, at least in the case of vehicle-mounted LiDAR since the native data from the LiDAR scanner is in the vehicle frame of reference. However, in some cases the Earth referential system or another referential system may be the "master" frame of reference, particularly if dealing with point cloud data obtained from a scanner or other point cloud generator fixed in another frame of reference, e.g. mounted to a roadside object.

The motion of a referential system relative to the master referential system may be defined using a translation, i.e. a 3D vector, and three rotations. Any solid motion can be decomposed this way by using the so-called three Euler rotations or simple yaw, pitch and roll as illustrated in FIG. 1. In this sense "solid" motion may be understood as a rigid transformation, i.e. a transformation that preserves distance between points; in other words, isometry. Consequently, the syntax put in the bitstream that defines the motion of one frame of reference to another (master) frame of reference is made of a 3D vectors and three angles.

In another embodiment, the change of coordinates X of a referential system relative to the coordinates Y of the master referential system master may be defined using a linear transform:

$$Y = MX + V$$

where V is a 3D vector (for translation) and M is a 3×3 matrix that may contain the three rotations, like the yaw, pitch and roll noted above, or even non-solid transformations like dilations. Physically, one may not expect to see non-solid transformations of objects in the real world, but within the point cloud space it may be useful for non-real world applications, like virtual reality applications. Even in some example real world applications it may be useful to provide for the possibility of non-solid transformations between frames of reference because (1) the sampling is not uniform and sampling density decreases with the distance from a LiDAR which may create a deviation of optimal global motion from solid motions, and (2) practical search algorithms may be more efficient with non-solid motions.

In some example implementations, the matrix M and the vector V are quantized and coded into the bitstream to define the global motion of a frame of reference relative to the master frame of reference.

The encoder may determine the transform, i.e. the motion of the vehicle relative to the Earth, using sensors in some embodiments. For example, the vehicle position may be obtained from GPS data or any other geographic positioning system. Example geographic positioning system may be based on satellite communications, like GPS, or based on terrestrial signals and triangulation, etc. The orientation of the vehicle may be determined using an on-board Inertial Measurement Unit (IMU) or the like.

In some implementations, for example if such data are not available, not reliable or not precise enough for a given application, the encoder may determine the transform through object recognition and the analysis of the scene captured at two different times, e.g. the analysis of two frames of the point cloud. Alternatively, or additionally, the vehicle may use image data from a camera.

Figure 2:
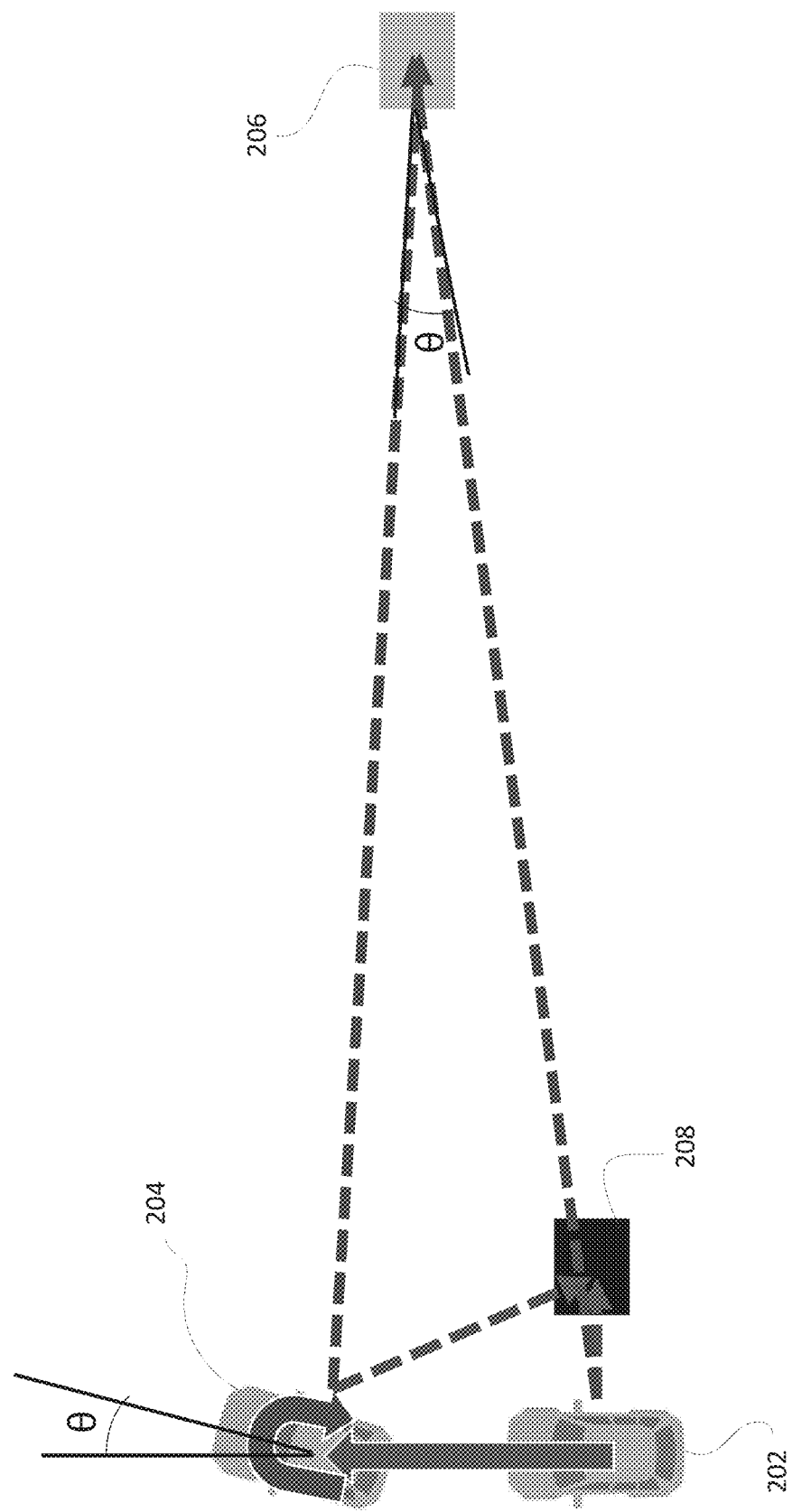
FIG. 2 shows in plan view, an example technique for determining relative movement of frames of reference.

Reference is now made to FIG. 2, which shows, in plan view, an example technique for determining relative movement of frames of reference based on object identification. A vehicle is shown at a first point 202 when it captures a first frame of data and at a second point 204 when it captures a second frame of data. Object recognition is used to identify at least one far object 206 and at least one near object 208 that the encoder is able to determine with reasonable certainty are fixed in the Earth referential system, i.e. stationary roadside objects. Certain categories of types of objects may be recognizable to the encoder and classified as Earth stationary objects.

The encoder may use the far object 206 to estimate the angle of vertical rotation (yaw) of the vehicle between the two frames; i.e., the angle of view of the far object 206 is roughly equal to the angle of the yaw. Also, after correction for the rotations by using the far object 206, the encoder may use the near object(s) 208 to estimate the translation of the vehicle from the first point 202 to the second point 204 in the Earth coordinates.

More advanced methods, may be used to estimate the combination of the three rotations based on the fact that certain portions of the point cloud may be expected to be motion invariant in a particular frame of reference. For example, some objects, like buildings, trees, relief, etc., may be expected to be motion invariant in the Earth frame of reference. When a point cloud is obtained from, for example, a vehicle-mounted scanner, those types of objects may be generally (a) distant/far objects, and (b) within a certain range of elevation relative to the ground. Such methods may use down-sampled versions of the frames. The matching may be seen as a minimization problem as function of the three angles.

One example practical algorithm to solve the linear transform Y=MX+V is based on the Least Mean Square (LMS) algorithm. Suppose, for example, a set of points $\{Y_j\}$ from a first point cloud taken at a first time, and a set of points $\{X_i\}$ from a second point cloud taken at a second time. Both sets of points are obtained using the same point cloud scanner or other sensor device and are assumed invariant in one frame of reference. The frame of reference may, in this example, be the Earth frame of reference. The points may be obtained using a LiDAR scanner or other sensors traveling on a moving vehicle that is invariant in a second frame of reference—the vehicle frame of reference. The sets of points $\{Y_j\}$ and $\{X_i\}$ are motion invariant in the Earth frame of reference. Such sets of points may be selected on the basis that they belong to far objects in the point cloud that are presumably buildings or other fixed infrastructure, in some embodiments.

The challenge is to find the transform and translation, M and V, such that the points $\{MY_j+V\}$ are as close as possible to the points $\{X_i\}$. If matched (or as close as possible), then M and V describe the motion of the Earth frame of reference relative to the vehicle frame of reference.

The LMS algorithm is well known to minimize the mean Euclidian distance between two sets of points if there is correspondence between them. Note that Euclidean distance is only one example measure of difference/distortion; in some other examples, an L1 norm be used for simplicity. It will be appreciated that algorithms other than LMS may be used to find a minimized distance between sets of points, such as steepest descent, for example, and the present application is not limited to use of LMS. In some example implementations, the encoder may find M and V iteratively using a method like the following example:

1. start with a global motion with M=identity and V=0;
2. find a correspondence from $\{Y'_j=MY_j+V\}$ to $\{X_i\}$, for example by taking for each point $Y'_j$ the closest point $X_{i(j)}$;
3. determine, using LMS for example, M' and V' such that $\{M'Y'_j+V'\}$ minimizes the distance from $\{X_{i(j)}\}$ when the correspondence j→i(j) found in 2 is used;
4. update M by M'M and V by M'V+V' because M'Y'+V'=M'(MY+V)+V'=M'MY+M'V+V'; and
5. loop to 2 until the mean distance between $\{Y'_j\}$ and $\{X_{i(j)}\}$ has converged.

Segmentation into Regions

In some embodiments, the segmentation into regions is predetermined. For example, in the case of a vehicle, a certain size zone around the LiDAR scanner may be designated as a first region attached to a frame of reference centered at the LiDAR scanner, and the area outside that zone is a second region attached to a second frame of reference fixed to the Earth referential system. In such an embodiment, the encoder and decoder simply apply the predetermined segmentation to the point cloud data.

In some other embodiments, the encoder may perform the task of segmenting the point cloud 3D space into regions. In particular embodiments, a Rate Distortion Optimization (RDO) process is applied by the encoder to decide to which region each "part" or portion of the space belongs. For example, the encoder may segment the space in a number of parts and on a part-by-part basis assess whether that part should be in the first region, second region, etc.

In yet other embodiments, portions of the 3D space may be pre-allocated to particular regions, and other portions of the space may be dynamically assigned to one of the regions using a cost evaluation by the encoder. The cost evaluation may be incorporated into rate-distortion optimization processes, in some implementations.

The granularity at which the segmentation is signaled should not be too small, otherwise the bitrate of the segmentation will become higher than the bitrate saved by better MV coding. For example, it is highly unlikely that signaling segmentation point-by-point would be advantageous.

In one example embodiment, create a low-resolution 3D map of an area surrounding the vehicle may be developed that will serve as a 3d histogram of occupancy. For each point in each point cloud, increment the count for the corresponding region in the histogram. For a point cloud to be coded, use the rate of occupancy of the histogram volumes to estimate frame of reference attachment. That is, aliased objects such as the road will have high rates of occupancy, whereas objects in a different frame of reference will be spread across the histogram, allowing determination using a thresholding approach. A decay function may be used to maintain adaptivity in the model.

Figure 3:
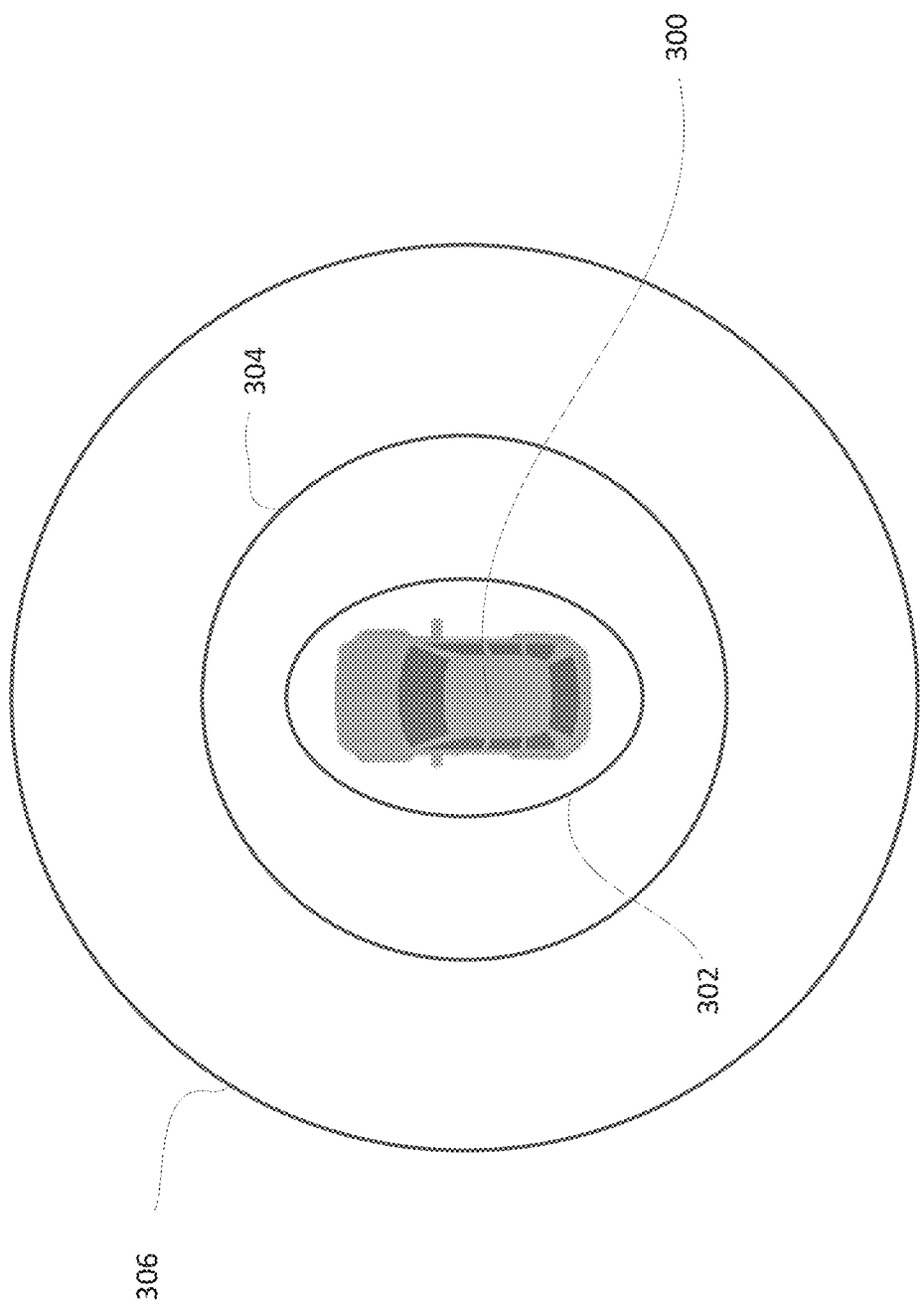
FIG. 3 shows a plan view of an example vehicle and defined regions around the vehicle.

FIG. 3 diagrammatically illustrates a plan view of an example vehicle 300. Surrounding the vehicle 300 are three concentric regions, an inner region 302, an intermediate region 304, and an outer region 306. The regions 302, 304, 306 may be cylindrical as illustrated. In the example shown, regions 304 and 306 are right circular cylinders and region 302 is a right elliptical cylinder. In some embodiments, they may be cuboids, spheres, or any arbitrary 3D shape. The inner region 302 is associated with or attached to a first frame of reference fixed to the vehicle or LiDAR scanner. This inner region 302 contains mostly the vehicle 300 itself and portions of the road in very close proximity to the vehicle 300. Objects in the inner region 302 are very likely to be motion invariant with respect to the first frame of reference. The outer region 306 contains distant objects that are very likely to be fixed to the roadside, e.g. infrastructure, buildings, topography, so the outer region 306 is associated with, or attached to, the Earth referential system, i.e. a second frame of reference.

Sandwiched between the inner region 302 and the outer region 306 is the intermediate region 304. In the intermediate region 304 objects may be invariant in either of the Earth or vehicle referential systems, or even neither of them, e.g. other vehicles, pedestrians, etc. Therefore, in some example implementations, with such a region the encoder decides "locally" whether portions of the intermediate region 304 are attached to first or second frame of reference, i.e. the Earth or vehicle referential systems. Depending on how "locally" is defined in a specific implementation, there are various syntax constructions possible to signal the segmentation of the intermediate region 304.

In one embodiment, the finest granularity to which a meaningful segmentation may apply is the Prediction Unit (PU). A PU is a 3D block or cuboid to which a motion vector is attached and applied. An example of PU is described below, however the proposed segmentation is not limited to this particular PU structure.

Point clouds have a fundamental difference relative to video where all pixels are occupied: points of a point cloud do not occupy the whole 3D space. On the contrary, the space is generally very sparsely occupied by the points of the point cloud. Consequently, only parts of the space that are occupied by the current point clouds should be eligible to undergo a prediction. A global structure may be useful to signal these eligible parts. In this regard, the concept of a 3D Largest Prediction Unit (LPU) may be introduced.

In general, a 3D space may be partitioned into LPUs, inside of which local prediction modes (coding modes) may be selected. For simplicity, LPUs in this example may be 3D cuboids obtained from a regular grid partitioning of the 3D space. An LPU that contains at least one point of the point cloud is a populated LPU and an LPU that contains no points of the point cloud is a non-populated LPU.

A flag may be used to signal whether or not each LPU is populated. However, this may lead to many flags to encode and, in order to improve compression, these flags may be inferred by the collocated LPU of a reference point cloud and/or neighbouring LPUs of the current point cloud, in some embodiments.

Depending on the local topology, a LPU may be too big to adequately obtain a prediction of the points belonging to it. Thus, it may be advantageous to split a LPU into smaller Prediction Units (PUs). The determination of whether to split an LPU into smaller PUs may be built into the RDO-based coding mode selection process. A flag may indicate whether a PU is further split for any PU that is populated, unless it may be inferred to be split/not-split based on side information. For example, maximum split depth may imply "not split".

Figure 4:
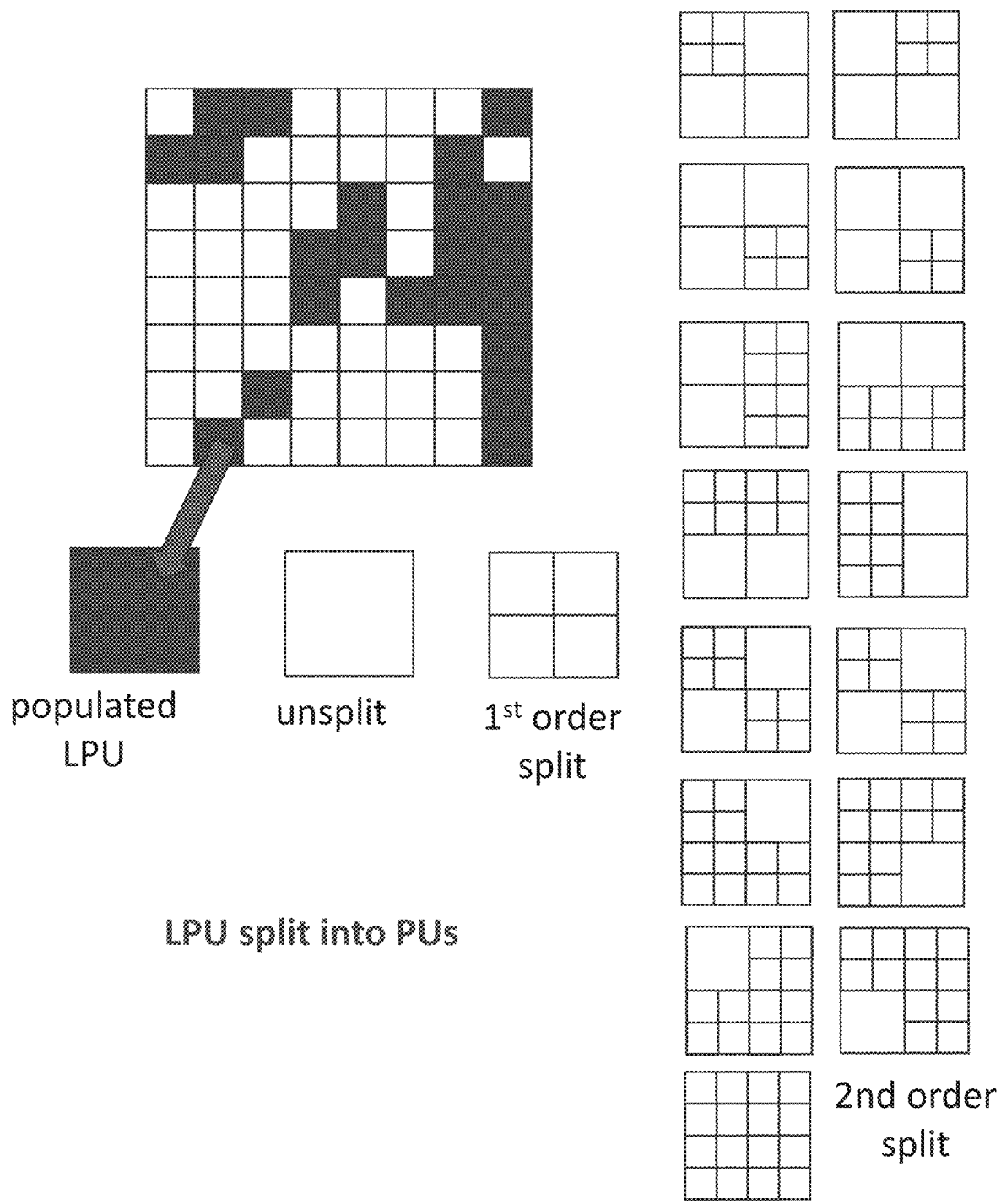
FIG. 4 shows various $1^{st}$ and $2^{nd}$ order combinations/permutations that split a largest prediction unit into prediction units.
Figure 5:
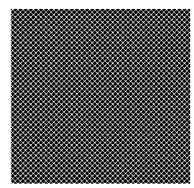
FIG. 5 shows an example of prediction unit split and occupancy signaling.
Figure 5:
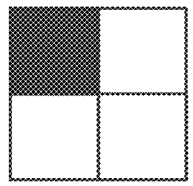
Figure 5:
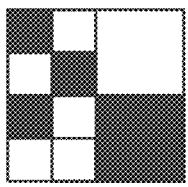

FIG. 4 shows, in 2D form for simplicity, the various 1st and 2nd order combinations/permutations that split an LPU into PUs. An example of splitting/occupancy flags for an illustrative 2-D embodiment is shown in FIG. 5.

The cost of coding the PU tree may further be incorporated into the cost function for the RDO-based search process. To select the best PU structure during the competitive process, the encoder may use the additive property of the costs. Individual PU costs are summed together with the PU tree associated rate to obtain the total cost of a LPU. The LPU structure, together with its associated modes, having the least cost may be selected as the best structure.

A motion vector (MV) is associated with each non-split (L)PU and coded in the bitstream. Motion compensation of the reference point cloud is performed accordingly to the coded motion vectors, each motion vector being applied to the part of the point cloud related to its associated PU.

In some embodiments of the present application in which a region is not pre-associated with a specific frame of reference, a segmentation syntax may be coded for each PU in order to signal to which region (and its related referential system) the PU belongs. Practically, this segmentation syntax may be implemented in various ways that are all substantively equivalent, namely:

Segmentation with a dedicated syntax. In this example, the coding of each PU includes a syntax element identifying to which region the PU belongs. In the case of two regions, this may be a simple flag indicating whether the PU is attached to the first or second frame of reference. In the case of more than two frames of reference, an index pointing to an element in a list of frames of reference is coded for each PU. The coded MV is the residual motion vector that is added to the global motion (transform) associated with the identified frame of reference to obtain the motion vector to be applied for compensation.

Segmentation through MV predictors. Global motion vectors are put in a list of MV candidates and the segmentation is performed through the selection of a candidate. Again, the coded MV in the PU is the residual motion vector. The list of MV candidates may include the global motion (transform) of the frames of reference and may, in some cases, include additional candidates. For example, one or more candidates may be based nearby previously-coded motion vectors in neighbouring PUs or LPUs. The ordering of the list may changes dependent upon which vector/transform is most probably given a recent history.

Segmentation through frames of reference. At the decoder, for each frame of reference, its corresponding transform is applied to the reference point cloud to generate a motion compensated point cloud (i.e. a motion compensated reference cloud to be used in generating a prediction). A motion vector is coded for each PU as well as an index that identifies which of the motion compensated point clouds the motion vector points to. In this case, the segmentation is performed through the index identifying a reference point cloud that was motion compensated by the transform corresponding to the frame of reference attached to that region.

Segmentation by PU position. If the region where a particular referential system is used may be well defined according to some function (PUx,PUy,PUz)→referential system index, then automatic segmentation may be performed. A description of the function may be transmitted in a parameter set or slice/tile/other header. One such example function description is based on circular (or elliptical) zones around an origin, with the radii and foci being provided in an appropriate header. For each PU a determination is made according to the PU position to select the referential system index. The encoder may dynamically adjust the radii and foci for the zones based on RDO and signal the radii and foci to the decoder for each point cloud.

Signaling of Frames of Reference

One method to signal a frame of reference attached to a PU and the motion vector for that PU is as follows:

1. Examine the neighbouring PUs of a current PU and build a histogram of the referential system indices. Neighbouring PUs may be the PUs sharing a face, edge, vertex, etc. In some embodiments neighbouring PUs may include the N most-recently coded PUs, where N is a suitable number for identifying PUs in the vicinity of the current PU.
2. Sort the histogram by occurrence to determine the most likely index.
3. Signal if the most likely index is used or not (via an indication, such as a flag, in the bitstream). If not, code the required index (excluding the most likely index as a possibility).
4. Derive an MV prediction using the subset of neighbouring PUs with the same index.
5. Determine the MV and find the residual MV by subtracting it from the MV prediction, and then encode the residual MV.

An alternative method constructs a list of candidate indices as follows:

1. (same as 1 above)
2. Sort the histogram by occurrence to produce a list of indices (in decreasing order of occurrence).
3. Append to the list any indices of known frames of reference that are not already in the list.
4. Signal the position in the list of the frame of reference to be used for the current PU.
5. (same as 4 and 5 above)

Signaling (via an indication in the bitstream) of the most likely referential system index (either as a flag, or the list position) may be further improved through contextualisation. For example, in particular regions it can be expected that the majority of PUs will use the same (and therefore most probable) index. However, in transition regions, the interaction between scan pattern and the transition zone may adversely affect the entropy coding statistics associated with the most likely referential system index. To reduce this effect, the context with which to code the most likely referential system index may be determined based on a property of the histogram determined in step two above. For instance, if there is only one entry in the histogram, or if there is a significant difference between the number of occurrences of the most likely index and the second most likely index, then one context is chosen. If however, the difference in occurrence between the first and second entries is small, a second context is used.

Another method, which may be either independent or work in conjunction with those previously described, is to use the position of the PU to aid in selection of the index. For example, the PU location may be used to determine, by way of a function, a most probable index. Alternatively, the position indicated index may be inserted into the list of the steps two above with an appropriate weight in order to influence the ordering.

Selection of neighbouring PUs need not be limited to PUs at the same tree depth. For example, neighbours of the parent PU may also be considered.

Finally, a pruning method may be used (at both the encoder and decoder) to reduce the list of candidate frames of reference. If the construction of the MV coding scheme requires that any final MV must indicate an occupied region in the reference, and since point clouds can be very sparsely occupied, a process may be used to eliminate candidate frames of reference that would result in the derived MV pointing to an unoccupied region. Such a process may implemented as:

1. Decode deltaMV
2. Build the candidate list (step two above)
3. For each candidate:
   a. determine the MV predictor and resolve the final MV.
   b. if the final MV indicates an unoccupied region, prune the candidate from the list Slices can be introduced in a similar manner to video compression by being defined as a set of consecutive 3D blocks (or Largest Prediction Units) according to some scan/traversal order, each slice commencing with a header. In an embodiment of the invention, a frame of reference index may be added to the slice header to signal that all units of the slice are part of the region related to the frame of reference. Consequently, the slice is the smallest region granularity in this variant.

An alternative embodiment allows each slice to maintain an independent list of frames of reference (independence relates to both length and order of elements in the list). For example, a point cloud coded using multiple slices, with frames of reference A and B may contain some slices that only use one of A, B, or the empty list; some slices with the list [A, B]; and some slices with the list [B,A], depending upon the region of the point cloud that the slice intersects.

The provision of per-slice referential systems is not necessarily incompatible with the previously described PU segmentation. In the case of multiple indices for example, the slice provides the list of referential systems from which the per PU choice is made.

In video, a tile may represent a disruption to the normal raster scan of coding units (e.g. macroblocks). In essence, tiles add a hierarchical scanning order, with tiles themselves being ordered in a raster-scan order and the blocks within the 2D rectangular region of a tile being independently raster scanned. Tiles may or may not be independent entities—an independent tile is decodable independent of any other tile, whereas a dependent tile may allow the codec to reference data in adjacent tiles to a current tile. Slices may interact with tiles in a number of different ways. If slices represent LPUs in the coding order (i.e. the hierarchical scan), then a slice may contain a complete tile, two or more complete tiles, an incomplete tile, or one or more complete tiles and an incomplete tile. Slices may be configured to be unbounded in size such that they are required to align with tile boundaries and thus contain only complete tiles, or of fixed size in which case a tile may span more than one slice. Slice size might be constrained to align with network transmission requirements, for example.

In terms of a 3D point-cloud, a tile may represent a 3D sub-volume. Due to the sparse nature of point clouds, there need not be any requirement that the set of tiles encompasses the entire 3D volume. The term "tile" (or "brick") is used here since the concept of a tile may be familiar from video coding. Although the common understanding of the term "tile" may imply a 2D structure it will be appreciated that references herein to a "tile" refer to a 3D sub-volume, such as a cuboid.

Accordingly, in some embodiments, instead of signaling the frame of reference index or indices at the slice level, it may be advantageous to signal on a per tile basis. Each tile may specify the region or frame of reference in a tile header, or the list of candidate frames of reference, with subsequent MV derivation being performed in the same manner.

If tiles are not independent, it may be advantageous in some implementations to allow prediction of the frame of reference index or indices spatially between tiles. If a point cloud is coded with many tiles, there may be a high degree of correlation between certain tile header flags. A syntax element indicating that a current tile should copy the header parameters of a neighbouring tile can reduce the tile signaling overhead. Such a syntax element may indicate the neighbouring tile from which to copy (or be merged with) by way of a direction (eg, prev-x, prev-y, prev-z) that corresponds to a previously decoded tile. Alternatively the syntax element may indicate a tile from a list of available tiles in the neighbourhood.

Rather than requiring a tile to specify the exact neighbour from which to copy parameters, an implicit selection mechanism may encode this information in the order in which tiles are coded or transmitted. For example, a tile header flag may specify that the parameters should be copied from the previous tile in transmission order. An encoder is free to order the tiles in any manner it sees fit so as to exploit this ordering. Alternatively, if tiles contain a numeric identifier, the source tile may be specified as a delta in the numeric identifier to the current tile, thereby increasing transmission robustness at the expense of some coding efficiency.

If there is a high degree of correspondence between tile parameters and if a point cloud is coded with a large number of tiles, a system may improve efficiency by using an extra level of indirection. In this context a tile set indicates a set of common parameters, including region or frame of reference indices. Each tile indicates to which tile set it belongs.

Due to the sparse nature of 3D point clouds and a possible breadth-first traversal of a hierarchical geometry tree, a more generic definition of a tile may be used that encompasses both the notion of a tile or slice (this concept may be called a brick, or some other term). One definition may describe a tile as having a position (relative to some greater volume) and encompassing a set of points, thereby forming a sub-volume of the entire point cloud.

Tiles may be adjacent and independent (providing the benefits of slices (data integrity, parallelism), or may be overlapping. Overlapping tiles permit segmentation of a point cloud based on properties of the point cloud. One such property is the frame of reference index or indices associated with the tile. An encoder segments based on zone, each tile has appropriate frame of reference index/ices, and decoder reconstructs each and combines.

The process of segmentation divides the point cloud into two or more point clouds, with each point in the original being present in only one of the segmented point clouds. Since there may be a locality to frames of reference, the occupancy of one segmented point cloud may be partially inferred from another: if a PU is occupied in one point cloud, it will be (or is highly likely) to be unoccupied in all others.

Encoder and Decoder

Figure 6:
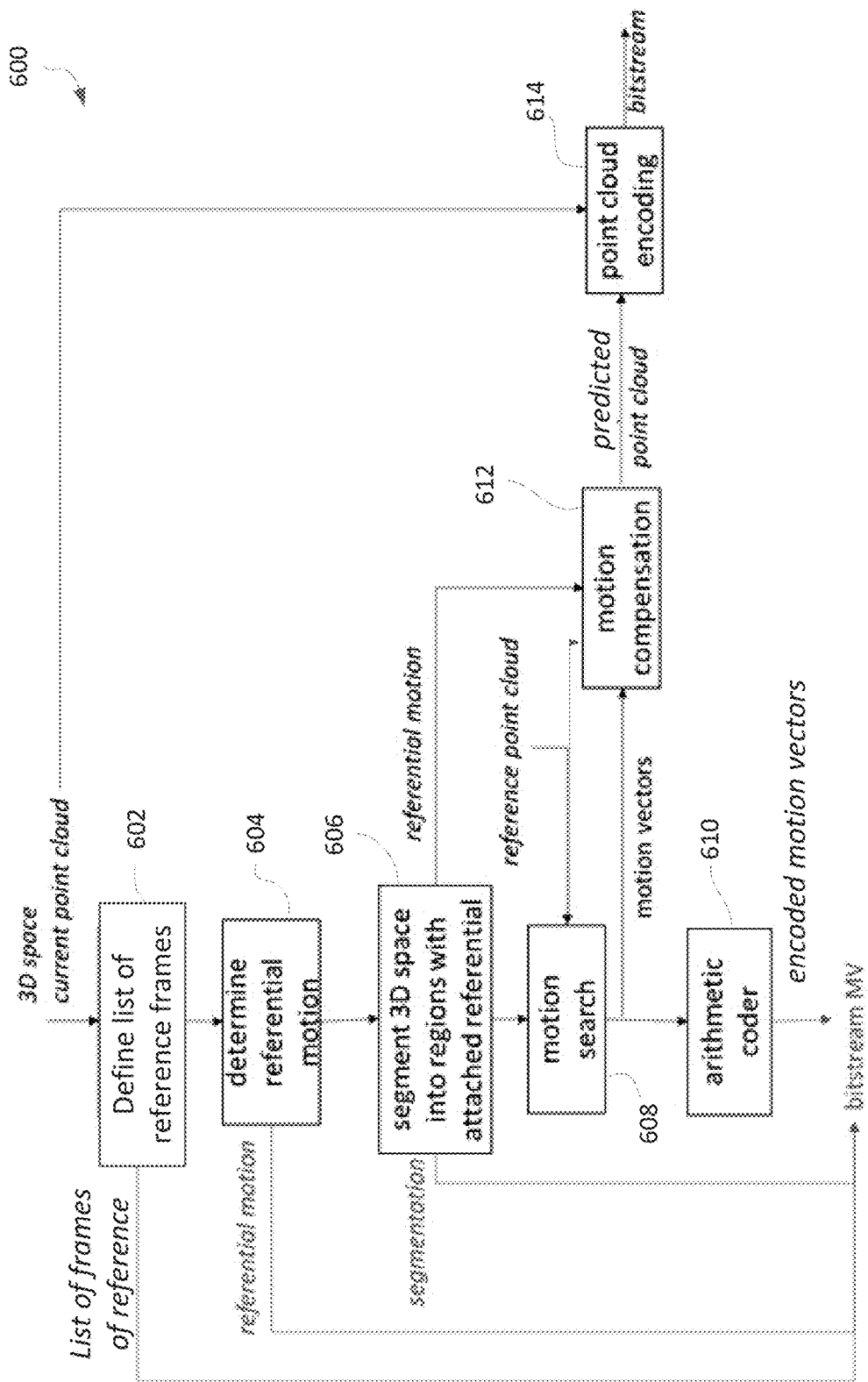
FIG. 6 shows, in block diagram form, an example encoding process.

Reference is now made to FIG. 6, which shows, in block diagram form, an example of an encoder process 600. The process 600 includes determining the frames of reference 602. This may be referred to as a "list of frames of reference" or a "list of referential systems". In some embodiments, the frames of reference may be predetermined, e.g. the vehicle and Earth referential systems, but in other embodiments the selection of suitable frames of reference may be more dynamic and may be made on-the-fly. As noted above, the list of frames of reference may shift and change, as certain frames of reference become more likely to be selected for a given PU.

The motion between frames of reference is determined 604, using any suitable technique, such as GPS and an orientation sensor. That relative motion between a master frame of reference and each other frame of reference may be expressed as a transform, which may be formatted as a matrix M and a vector V. Those quantities are encoded in the bitstream. In some cases, they may be quantized before encoding.

The encoding process 600 then includes segmenting the 3D space into regions 606, each region being associated with or attached to one of the frames of reference. In other words, the segmentation data that is encoded in the bitstream to signal the structure of the segmentation includes data identifying the associated frame of reference. As noted above, in some implementations a region may be well-defined and may have a pre-associated frame of reference. In some implementations, portions of the 3D space may be more dynamically allocated to one of the regions and its associated frame of reference.

It will be noted that the motion search 608 takes into account the frame of reference identified for a given PU. Based on that frame of reference, the motion search 608 finds a locally optimal motion vector for predicting that PU from the reference point cloud data. The resulting output is the motion vector relative to the associated frame of reference.

The motion vectors are entropy encoded 610 and output to form part of the bitstream. The encoding of the motion vectors may be encoding of a residual motion vector relative to a neighbouring motion vector or an average of two or more neighbouring motion vectors in some cases.

Accordingly, the output bitstream of side information signaling motion compensation data to the decoder includes the encoded motion vectors, where those motion vectors are relative to the frame of reference within which they are applied, the segmentation information defining the segmentation of the 3D space into regions and the frame of referenced associated with each region. That segmentation information may include, for part of the 3D space, signaling at the level of an LPU or PU to which region it belongs and, thus, to which frame of reference is it associated. The encoded side information may further include the referential motion, i.e. the transform defining the relative motion between a first or master frame of reference and a second frame of reference. The side information may also include data identifying the frames of reference, such as an ordered list thereof, to enable the segmentation information to identify associated regions/frames of reference by way of an index to the list. The side information may be provided in-band or out of band for instance via an SEI message.

The encoding process 600 employs the motion vectors to generate, from the reference point cloud, a prediction through motion compensation 612. The motion compensation 612 process also takes into account the referential motion, i.e. transform. In other words, it applies both the applicable transform and the motion vector to the reference point cloud to generate a prediction. In some implementations, the transform may be applied to the reference point cloud to place the reference point cloud in the applicable frame of reference, and the motion vector is then applied to find the prediction. In another implementation, the transform is applied to the motion vector to put it into the master frame of reference, and it is then applied to the reference point cloud to find the prediction.

The prediction is used in entropy encoding 614 the current point cloud. As noted earlier, the prediction is typically used as the basis for context selection in entropy encoding the occupancy data of the current point cloud. The encoded point cloud data is output as a bitstream.

It will be appreciated that portions of the process 600 may occur and may be signaled at different levels of granularity. For example, the list of frames of references, if signaled, may be determined for the whole point cloud and signaled in a header for the point cloud data. In some cases, it may be determined and signaled at a slice, tile, or LPU level of granularity. Likewise, the referential motion, i.e. transform(s), may be determined and signaled once for the point cloud and the transforms may be signaled in a header portion of the bitstream. Conversely, the motion vectors are typically signaled at the PU level.

Figure 7:
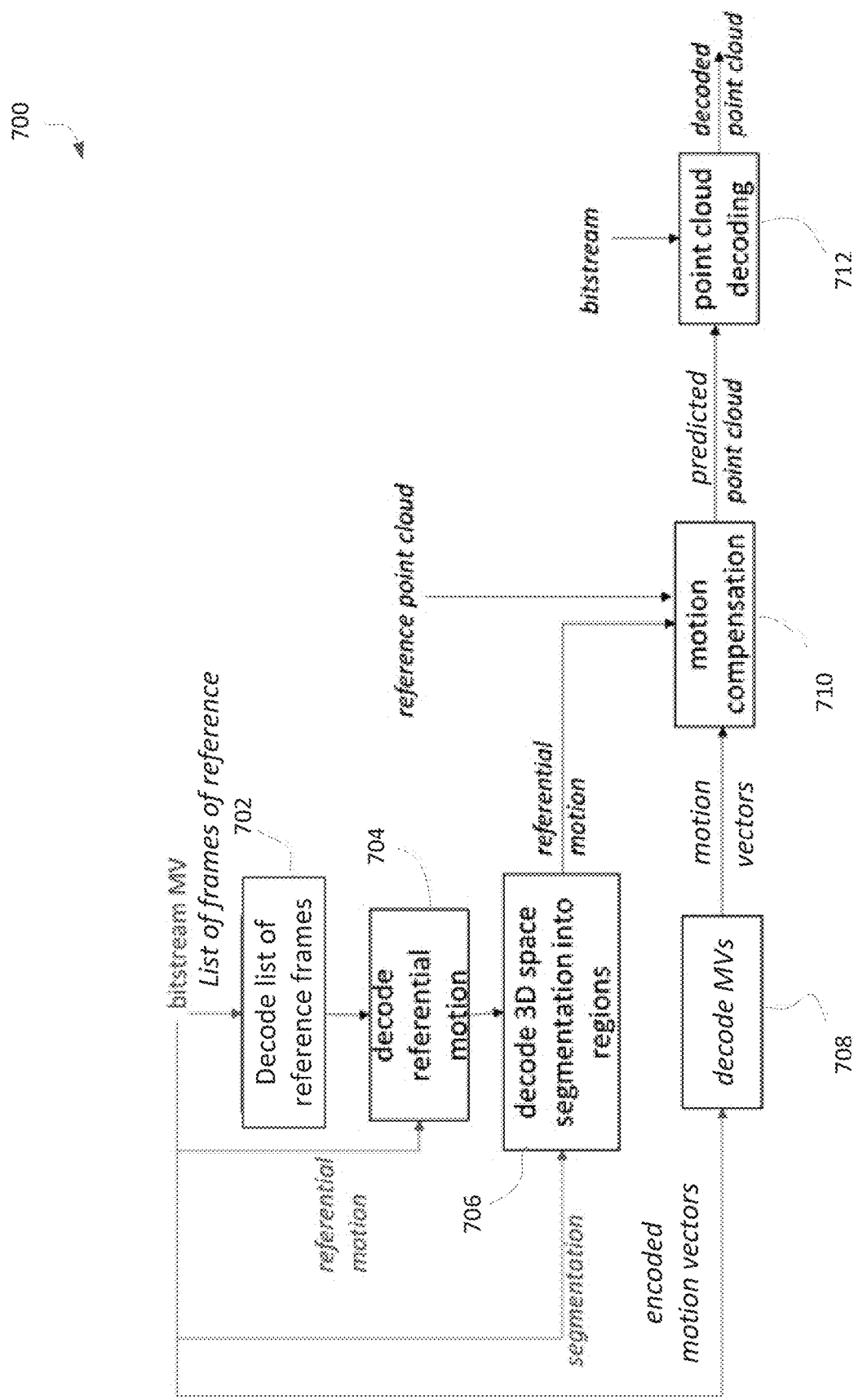
FIG. 7 shows an example decoding process.

FIG. 7 shows an example decoding process 700. The decoder receives a bitstream of encoded data that includes the encoded occupancy data for the point cloud, and includes the encoded side information, such as the segmentation information, motion vectors, referential motion data, etc. If the side information includes lists of frames of reference, then they are decoded 702 to determine the list. Referential motion, i.e. transform(s), are decoded 704 to find the relative motion between the master frame of reference and each other frame of reference. Segmentation information 706 is decoded to enable the decode to reproduce the same segmentation of the 3D space that was used at the encoder, and to identify to which region each part of the 3D space belongs, so that it understands in what frame of reference each motion vectors is defined. The segmentation and referential motion are used in a motion compensation 710 process, together with the decoded motion vectors 708, to produce the prediction.

Once the prediction is determined, it is used to entropy decode 712 the bitstream of encoded occupancy data to reconstruct and output the decoded point cloud.

Using a Prediction to Improve Compression of Point Cloud Data

As discussed above, the present methods and devices use point cloud predictions to improve the context-based coding process through improved context selection for coding the actual occupancy patterns. In some embodiments, the coding is binary entropy coding.

The contexts for coding the occupancy pattern may be subdivided into two or more subsets of contexts. In one example implementation, when coding an occupancy pattern for a sub-volume and selecting a context for coding, the context selection uses a first subset if the prediction indicates that the sub-volume contains no predicted points and uses a second subset if the prediction indicates that the sub-volume contains at least one predicted point. The coding may include coding a bit of an occupancy pattern in a binary entropy coder, in some examples.

Figure 8:
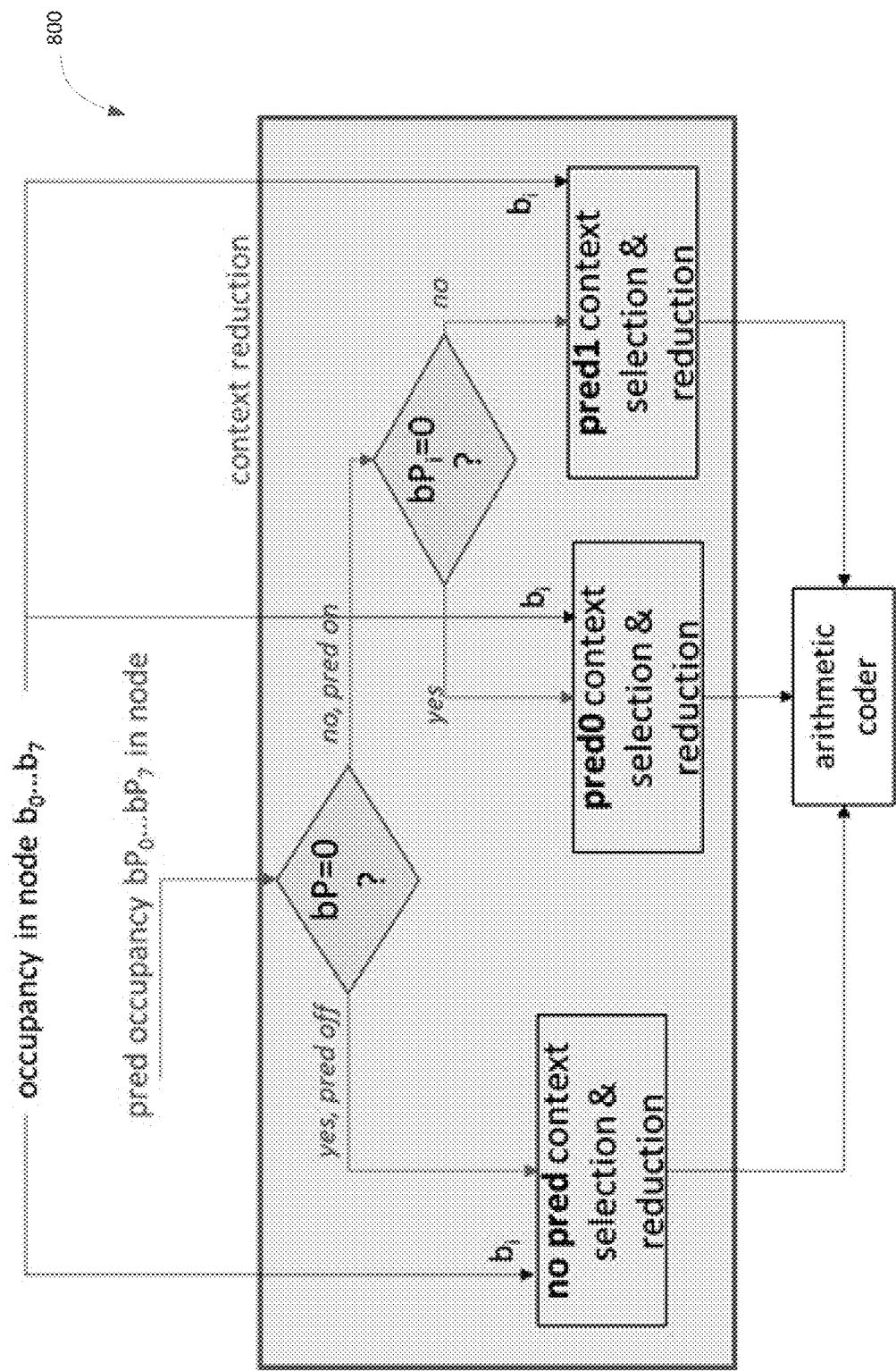
FIG. 8 shows, in block diagram form, part of a first example of a context-based entropy coder for use in encoding or decoding point cloud data.

Reference is now made to FIG. 8, which shows, in block diagram form, part of a first example of a context-based entropy coder 800 for use in encoding or decoding point cloud data. The context-based entropy coder 800 generates a predicted set of points in accordance with a coding mode. The context-based entropy coder 800 may be used to code an occupancy pattern, e.g. $b_0 \ldots b_7$, associated with a volume that has been subdivided into sub-volumes, where the occupancy pattern is a bit sequence where each bit $b_i$ indicates the occupancy status of a respective one of the sub-volumes in a prescribed order within the volume. The context-based entropy coder 800 may determine a predicted occupancy pattern, e.g. $bP_0 \ldots bP_7$, using the same volume/sub-volume partitioning of the space, where the predicted occupancy pattern is a bit sequence in which each bit $bP_i$ indicates whether there is at least one predicted point in a respective one of the sub-volumes in the prescribed order.

Rather than creating a residual by comparing the occupancy pattern to the predicted occupancy pattern, e.g. using XOR, the context-based entropy coder 800 uses the predicted occupancy pattern as the basis, at least in part, for selecting a context for coding the occupancy pattern. In some cases, the predicted occupancy pattern is the basis for selecting between two or more context sets, and further information, such as neighbour configuration and/or previously-coded bits of the occupancy pattern, serve as the basis for selecting a context from within the selected context set.

In this example, the context-based entropy coder 800 first determines whether the predicted occupancy pattern is empty. That is, whether $bP_i=0$ for all $i=0, \ldots, 7$. In such a case, there is effectively no prediction available with respect to the volume being coded, and prediction-based selection of contexts may be disabled for the coding of the occupancy pattern. As a result, in this case, the context-based entropy coder may select contexts for coding the occupancy pattern using whatever non-predictive context-based selection process is implemented. This may include reference to neighbour configuration, previously-coded bits of the bit sequence, etc.

If the predicted occupancy pattern is not empty, then on a bit-by-bit basis the context-based entropy coder 800 selects a context and codes the occupancy pattern bits. In this regard, it may, for each bit $b_i$, determine whether the corresponding sub-volume contains at least one predicted point, i.e. whether $bP_i$ is non-zero. If $bP_i$ is zero, it indicates that the corresponding sub-volume is predicted to be empty. On that basis the context-based entropy coder may select a first set of contexts, whereas if the prediction indicates that the sub-volume is predicted to contain at least one predicted point, then the context-based entropy coder may select a second set of contexts. Context selection within those respective sets may then occur for the bit $b_i$ based on context selection criteria or conditions, such as neighbour configuration, previously-coded bits of the sequence, etc. In some cases, the context selection for a bit $b_i$ from a set of available contexts is based on a combination of neighbour configuration, previously-coded bits of the occupancy pattern, and the predicted occupancy pattern bit $bP_i$, all of which are used to determine the index to a set of contexts that selects the context for use in coding the bit $b_i$. Once the context for coding $b_i$ has been determined, the bit bi is coded using an arithmetic coder.

Figure 9:
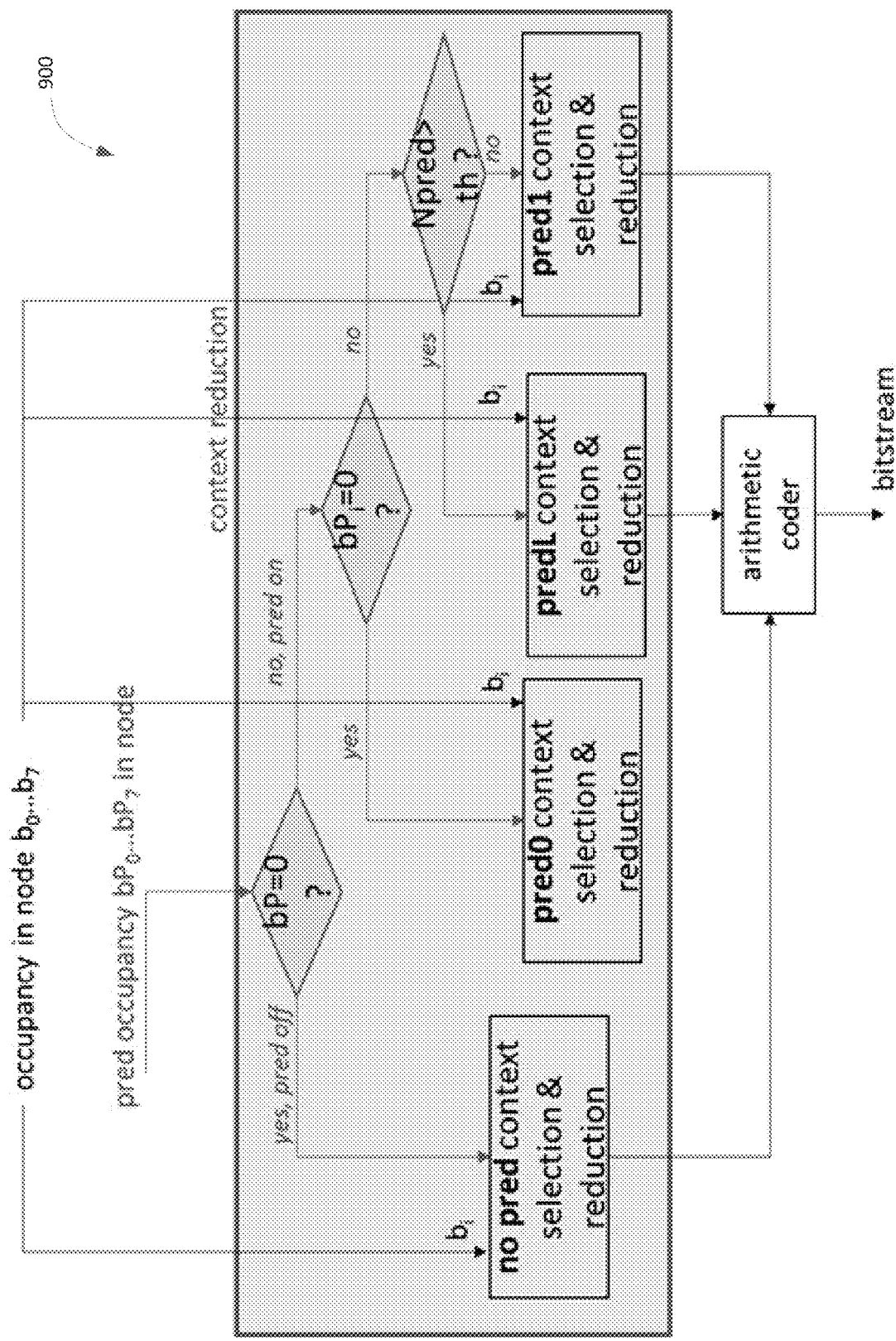
FIG. 9 shows another example of a context-based entropy coder for point cloud data.

Referring now to FIG. 9, another example of a context-based entropy coder 900 is shown. In this example, the entropy coder 900 uses the predicted occupancy pattern bP to select between subsets of contexts. If the predicted occupancy pattern is empty, the predictive context selection feature is disabled for coding the occupancy pattern and the coder 900 selects contexts using other criteria. The contexts may, in some embodiments, be selected from a first subset of contexts. If the predicted occupancy pattern is not empty, then the entropy coder 900 determines whether, for each bit $b_i$ to be coded, the corresponding predicted occupancy pattern bit $bP_i$ is non-zero. If it is zero, then the corresponding sub-volume is predicted to be empty and a second subset of contexts may be used for coding the bit $b_i$. If the predicted occupancy pattern bit $bP_i$ is non-zero, then the sub-volume is predicted to contain at least one point. In this example, the entropy coder 900 then assesses how many predicted points are found with the corresponding sub-volume. If the number of predicted points in the sub-volume does not exceed a preset threshold value, then the sub-volume is predicted to be occupied but sparsely populated and a third subset of contexts is used for coding. If the number of predicted points in the sub-volume exceeds the preset threshold value, then the sub-volume is predicted to be densely populated with points and a fourth subset of contexts is then used for selecting a context for coding $b_i$.

The preset threshold value may be set to any number that signals a densely populated sub-volume. Tuning of the preset threshold value may take place using test sequences to identify a value that best results in compression improvements through context selection for occupied sub-volumes.

In yet a further example implementation, the entropy coder 900 may have more than one preset threshold value against which the count of predicted points within the sub-volume is compared, and which is used as the basis for selecting a subset of contexts for coding the occupancy pattern bit $b_i$.

It will be appreciated that the present context selection process described in the above examples integrates well with other context selection processes, whether they involve neighbour configuration, previously-coded occupancy pattern bits, or context reduction operations.

Figure 10:
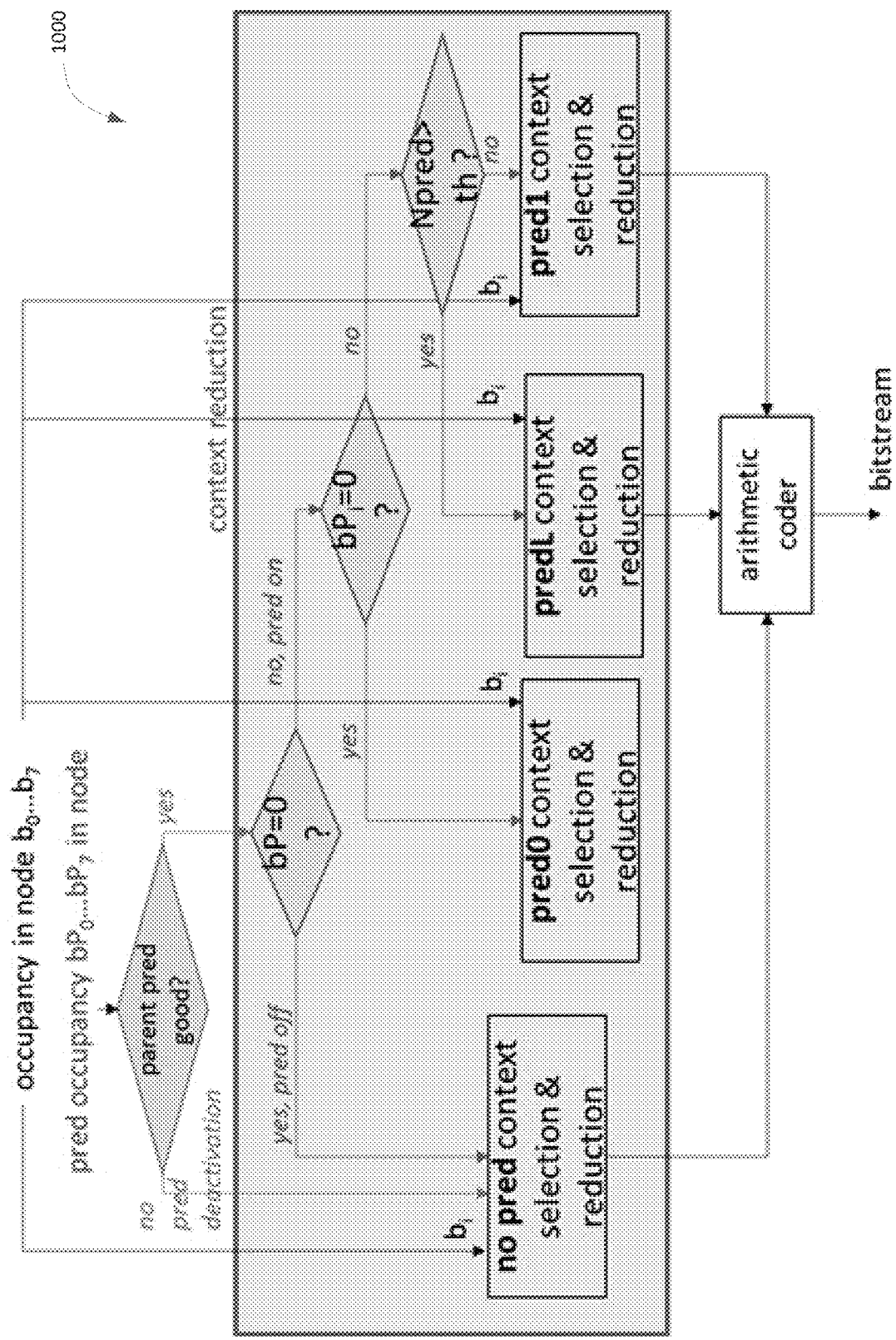
FIG. 10 shows a third example of a context-based entropy coder for point cloud data.

Reference is now made to FIG. 10, which shows a further example of part of a context-based entropy coder 1000. The context-based entropy coder 1000 uses the same process described above with regard to the second example context-based entropy coder 900, but in this case includes a conditional prediction deactivation operation. It may be that some regions of the point cloud are well predicted and some portions are poorly predicted. It may be possible to evaluate the likely prediction quality locally by looking at the quality that was realized for parent nodes, i.e. at a larger scale of coding. If the prediction turned out to be rather poor for a parent node, then the prediction for child nodes is also likely to be poor. On this basis, the entropy coder 1000 may determine that prediction is not to be used for those child nodes.

A determination of the "quality" of a prediction may be made based the number of bits in an occupancy pattern that were incorrectly predicted, i.e. count how many sub-volumes were incorrectly predicted to be occupied or unoccupied. This count, $N_{wrong}$, may be determined as:

$$N_{wrong} = \#\{j | bP_j! = b_j\}$$

The count of incorrectly predicted sub-volumes is then compared to a set threshold $N_{bad}$ and the node will be deemed "poorly predicted" if $N_{wrong} \geq N_{bad}$. In one illustrative example based on octree partitioning, $N_{bad}$ may be set to 4, although it will be understood that it may be set to other values.

Accordingly, when starting the coding of an occupancy pattern $b_0, \ldots b_7$ for a volume/node, the entropy coder 1000 first evaluates whether its parent volume/node was poorly predicted or not. If it was not poorly predicted, then the entropy coder 1000 uses prediction-based context selection (subject to possibly disabling it if the predicted occupancy pattern is empty) in coding the current node's occupancy pattern.

It will be appreciated that the above examples of entropy coders each use the predicted occupancy pattern as the basis for context selection. Moreover, in some of the examples, the predicted occupancy pattern is used as the basis for context set selection for coding a bit $b_i$ of the occupancy pattern dependent on whether the corresponding predicted occupancy bit is non-zero. In some cases, the count of predicted points within a sub-volume is also used as the basis for context set selection or context selection.

Impact on Compression Performance

The invention leads to MV residual with much less amplitude than the direct coding of MV. This leads to an easier search on the encoder side (lowered complexity) as well as better compression performance due to less bit rate required to encode the MV.

In testing, using a test model in the moving vehicle context and two frames of reference, compression improvement averaged about 4.5%.

Figure 11:
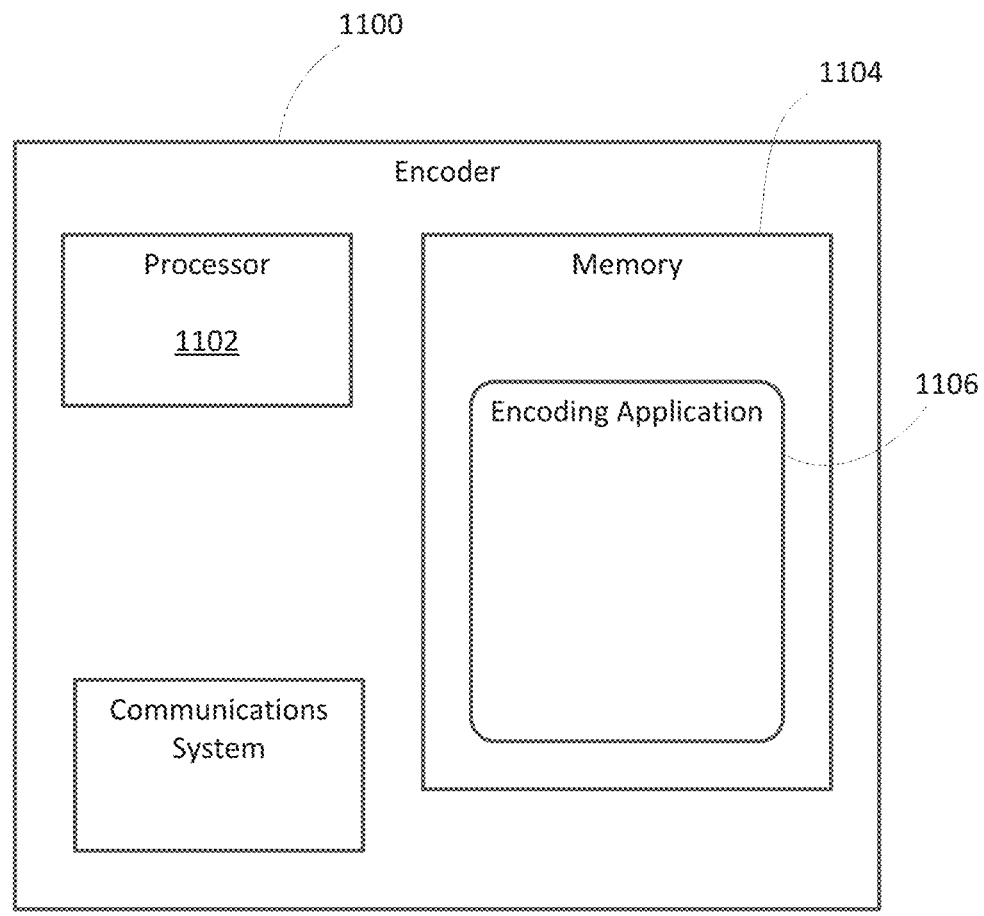
FIG. 11 shows a simplified block diagram of an example encoder.

Reference is now made to FIG. 11, which shows a simplified block diagram of an example embodiment of an encoder 1100. The encoder 1100 includes a processor 1102, memory 1104, and an encoding application 1106. The encoding application 1106 may include a computer program or application stored in memory 1104 and containing instructions that, when executed, cause the processor 1102 to perform operations such as those described herein. For example, the encoding application 1106 may encode and output bitstreams encoded in accordance with the processes described herein. It will be understood that the encoding application 1106 may be stored on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 12:
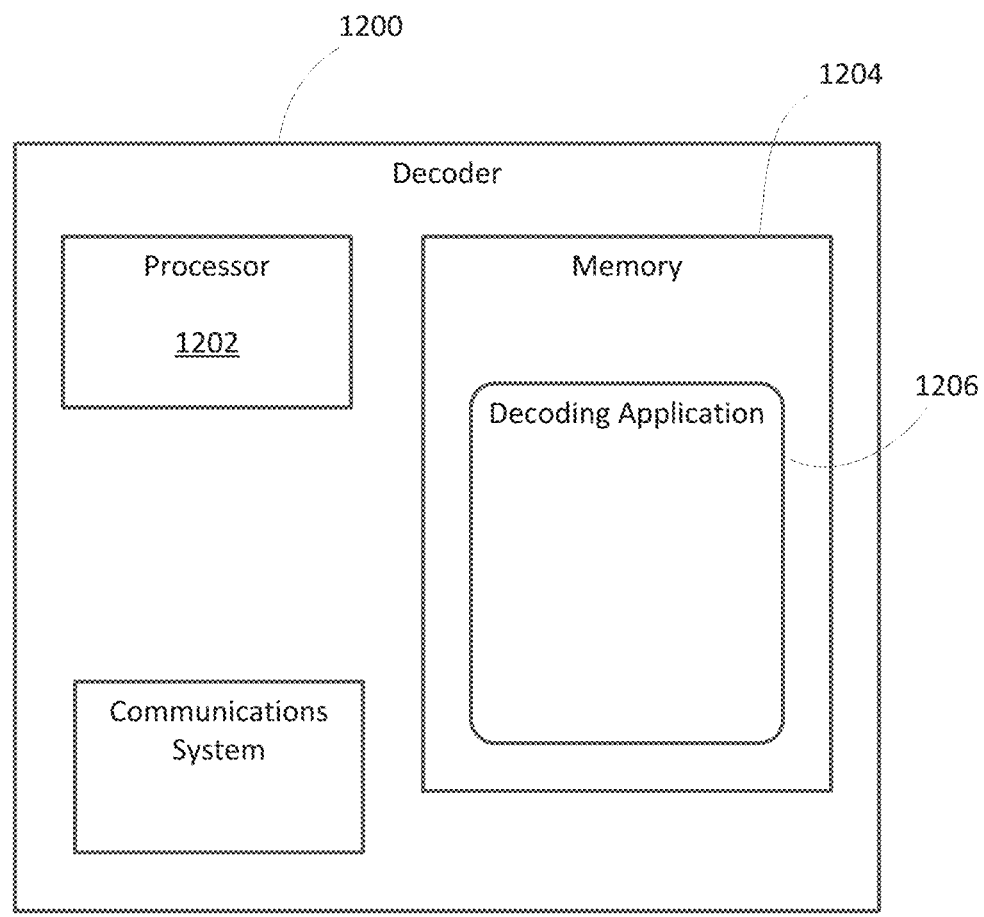
FIG. 12 shows a simplified block diagram of an example decoder.

Reference is now also made to FIG. 12, which shows a simplified block diagram of an example embodiment of a decoder 1200. The decoder 1200 includes a processor 1202, a memory 1204, and a decoding application 1206. The decoding application 1206 may include a computer program or application stored in memory 1204 and containing instructions that, when executed, cause the processor 1202 to perform operations such as those described herein. It will be understood that the decoding application 1206 may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

What is claimed is:

1. A method of encoding a point cloud, the point cloud being located within a volumetric space containing the points of the point cloud, each of the points having a geometric location within the volumetric space, the method comprising:
    determining a transform defining relative motion of a second frame of reference to a first frame of reference;
    segmenting the volumetric space into regions, each region being associated with one of the first frame of reference or the second frame of reference;
    for a cuboid in one of the regions, generating a predicted sub-volume based on previously-encoded point cloud data and a local motion vector expressed relative to the frame of reference associated with said one of the regions, wherein generating includes applying the transform to the local motion vector to generate a transformed local motion vector and applying the transformed local motion vector to the previously-encoded point cloud data to generate the predicted sub-volume;
    entropy encoding occupancy of the cuboid based in part on the predicted sub-volume; and
    outputting a bitstream of encoded data including the entropy encoded occupancy of the cuboid, the local motion vector, and the transform.

2. The method claimed in claim 1 wherein the first frame of reference is fixed to a vehicle and wherein the second frame of reference is fixed to Earth.

3. The method claimed in claim 1, wherein segmenting includes segmenting at least a portion of the volumetric space into prediction units and assigning each prediction unit to one of the regions.

4. The method claimed in claim 1, wherein the transform includes a 3D matrix and a 3D vector.

5. The method claimed in claim 1, further comprising determining a list of frames of reference and encoding the list, and wherein segmenting includes, for each region, encoding an index to the list that associates that region with one of the frames of reference from the list.

6. An encoder for encoding a point cloud to generate a bitstream of compressed point cloud data, the point cloud being located within a volumetric space recursively split into sub-volumes and containing the points of the point cloud, each of the points having a geometric location within the volumetric space, the encoder comprising:
    a processor;
    memory; and
    an encoding application containing instructions executable by the processor that, when executed, cause the processor to:
        determine a transform defining relative motion of a second frame of reference to a first frame of reference;
        segment the volumetric space into regions, each region being associated with one of the first frame of reference or the second frame of reference;
        for a cuboid in one of the regions, generate a predicted sub-volume based on previously-encoded point cloud data and a local motion vector expressed relative to the frame of reference associated with said one of the regions, wherein generating includes applying the transform to the local motion vector to generate a transformed local motion vector and applying the transformed local motion vector to the previously-encoded point cloud data to generate the predicted sub-volume;
        entropy encode occupancy of the cuboid based in part on the predicted sub-volume; and
        output a bitstream of encoded data including the entropy encoded occupancy of the cuboid, the local motion vector, and the transform.

7. The encoder claimed in claim 6, wherein the first frame of reference is fixed to a vehicle and wherein the second frame of reference is fixed to Earth.

8. The encoder claimed in claim 6, wherein the instructions, when executed, are to cause the processor to segment by, at least, segmenting at least a portion of the volumetric space into prediction units and assigning each prediction unit to one of the regions.

9. The encoder claimed in claim 6, wherein the transform includes a 3D matrix and a 3D vector.

10. The encoder claimed in claim 6, wherein the instructions, when executed, are to further cause the processor to determine a list of frames of reference and encode the list, and wherein segmenting includes, for each region, encoding an index to the list that associates that region with one of the frames of reference from the list.

11. A method of decoding encoded data to reconstruct a point cloud, the point cloud being located within a volumetric space containing the points of the point cloud, each of the points having a geometric location within the volumetric space, the method comprising:
    decoding a bitstream to reconstruct a transform defining relative motion of a second frame of reference to a first frame of reference;
    segmenting the volumetric space into regions, each region being associated with one of the first frame of reference or the second frame of reference;
    for a cuboid in one of the regions, decoding the bitstream to obtain a local motion vector expressed relative to the frame of reference associated with said one of the regions, and generating a predicted sub-volume based on previously-encoded point cloud data and the decoded local motion vector, wherein generating the predicted sub-volume includes applying the transform to the local motion vector to generate a transformed local motion vector and applying the transformed local motion vector to the previously-encoded point cloud data to generate the predicted sub-volume;
    entropy decoding the bitstream to reconstruct occupancy of the cuboid based in part on the predicted sub-volume; and
    outputting the reconstructed point cloud, including occupancy of the cuboid.

12. The method claimed in claim 11, wherein the first frame of reference is fixed to a vehicle and wherein the second frame of reference is fixed to Earth.

13. The method claimed in claim 11, wherein segmenting includes segmenting at least a portion of the volumetric space into prediction units and assigning each prediction unit to one of the regions.

14. The method claimed in claim 11, wherein the transform includes a 3D matrix and a 3D vector.

15. The method claimed in claim 11, further comprising decoding a list of frames of reference, and wherein segmenting includes, for each region, decoding an index to the list that associates that region with said one of the frames of reference from the list.

16. A decoder for reconstructing a point cloud from a bitstream of compressed point cloud data, the point cloud being located within a volumetric space recursively split into sub-volumes and containing the points of the point cloud, each of the points having a geometric location within the volumetric space, the decoder comprising:
 a processor;
 memory; and
 a decoding application containing instructions executable by the processor that, when executed, cause the processor to:
  decode a bitstream to reconstruct a transform defining relative motion of a second frame of reference to a first frame of reference;
  segment the volumetric space into regions, each region being associated with one of the first frame of reference or the second frame of reference;
  for a cuboid in one of the regions, decode the bitstream to obtain a local motion vector expressed relative to the frame of reference associated with said one of the regions, and generating a predicted sub-volume based on previously-encoded point cloud data and the decoded local motion vector;
  entropy decode the bitstream to reconstruct occupancy of the cuboid based in part on the predicted sub-volume; and
  output the reconstructed point cloud, including occupancy of the cuboid.

17. The decoder claimed in claim 16, wherein the first frame of reference is fixed to a vehicle and wherein the second frame of reference is fixed to Earth.

18. The decoder claimed in claim 16, wherein the instructions, when executed, are to cause the processor to segment by, at least, segmenting at least a portion of the volumetric space into prediction units and assigning each prediction unit to one of the regions.

19. The decoder claimed in claim 16, wherein the transform includes a 3D matrix and a 3D vector.

20. The decoder claimed in claim 16, wherein the instructions, when executed, are to further cause the processor to determine a list of frames of reference, and wherein segmenting includes, for each region, decoding an index to the list that associates that region with one of the frames of reference from the list.

* * * * *